(12) United States Patent
Sawasato et al.

(10) Patent No.: US 9,296,852 B2
(45) Date of Patent: Mar. 29, 2016

(54) RESIN COMPOSITION AND HEAT-SHRINKABLE FILM THEREOF

(75) Inventors: Tadashi Sawasato, Ichihara (JP); Eiji Sato, Ichihara (JP); Katumi Ito, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/001,349

(22) PCT Filed: Feb. 24, 2012

(86) PCT No.: PCT/JP2012/054572
§ 371 (c)(1),
(2), (4) Date: Aug. 23, 2013

(87) PCT Pub. No.: WO2012/117964
PCT Pub. Date: Sep. 7, 2012

(65) Prior Publication Data
US 2013/0331519 A1    Dec. 12, 2013

(30) Foreign Application Priority Data

Mar. 1, 2011 (JP) ................................. 2011-043649

(51) Int. Cl.
*C08F 293/00* (2006.01)
*C08L 53/02* (2006.01)
*C08J 5/18* (2006.01)

(52) U.S. Cl.
CPC ................. *C08F 293/00* (2013.01); *C08J 5/18* (2013.01); *C08L 53/02* (2013.01); *C08J 2353/02* (2013.01)

(58) Field of Classification Search
USPC ......................................................... 525/89
See application file for complete search history.

(56) References Cited

U.S. PATENT DOCUMENTS

| | | | |
|---|---|---|---|
| 6,107,411 A | 8/2000 | Toya et al. | |
| 2004/0102576 A1* | 5/2004 | Matsui et al. | 525/180 |
| 2005/0089702 A1 | 4/2005 | Matsui et al. | |
| 2005/0222331 A1 | 10/2005 | Hoshi et al. | |
| 2007/0196604 A1* | 8/2007 | Kurokawa et al. | 428/34.9 |
| 2009/0130351 A1 | 5/2009 | Hoshi et al. | |

FOREIGN PATENT DOCUMENTS

| | | |
|---|---|---|
| CN | 101263171 A | 9/2008 |
| JP | A-59-221348 | 12/1984 |
| JP | A-61-123517 | 6/1986 |
| JP | A-2001-354827 | 12/2001 |
| JP | A-2003-96262 | 4/2003 |
| JP | B2-3543917 | 4/2004 |
| JP | A-2005-60564 | 3/2005 |
| JP | B2-3659928 | 6/2005 |
| JP | 2005-213520 A | 8/2005 |
| JP | B2-3766820 | 2/2006 |
| JP | A-2007-31617 | 2/2007 |
| TW | 200307694 A | 12/2003 |
| WO | WO 03/091303 A1 | 11/2003 |

OTHER PUBLICATIONS

Extended European Search Report issued in European Patent Application No. 12751941.1 on Jul. 29, 2014.
May 29, 2012 International Search Report issued in International Patent Application No. PCT/JP2012/054572.
Nov. 15, 2014 Search Report issued in Chinese Patent Application No. 201280010519.7.
Aug. 12, 2015 Office Action issued in Taiwanese Patent Application No. 101106638.
English-language translation of Taiwanese Search Report included with Office Action issued in Taiwanese Patent Application No. 101106638, Aug. 12, 2015.

* cited by examiner

*Primary Examiner* — Jeffrey Mullis
(74) *Attorney, Agent, or Firm* — Oliff PLC

(57) ABSTRACT

A resin composition having as a main ingredient a block copolymer composed of at least one type of vinyl aromatic hydrocarbon and a conjugated diene, the resin composition being characterized in that the Vicat softening point temperature measured under a 10-N load as per ISO306 is 65-90° C., the flexural strength measured as per ISO178 is 58-80 MPa, the proportion of the conjugated diene in the resin composition is 10-25 mass %, and the resin composition has molecular weight peaks, the peaks being derived from the block copolymer composed of the vinyl aromatic hydrocarbon and the conjugated diene, at molecular weights in the ranges of 70,000-150,000 and 150,000-350,000, respectively.

4 Claims, No Drawings

RESIN COMPOSITION AND HEAT-SHRINKABLE FILM THEREOF

TECHNICAL FIELD

The present invention relates to a resin composition and a heat-shrinkable film using same.

BACKGROUND ART

Block copolymers consisting of vinyl aromatic hydrocarbons and conjugated dienes are commonly used as raw materials in heat-shrinkable films for shrink packaging. The physical properties required of shrink films are, for example, spontaneous shrinkage resistance which reduces the phenomenon of the films spontaneously shrinking when the films are stored in an ambient temperature environment that is not temperature-controlled. Patent Documents 1-3 describe that excellent spontaneous shrinkage resistance can be achieved by using block copolymers consisting of vinyl aromatic hydrocarbons and conjugated dienes, wherein the copolymers have specific polymer structures.

In recent years, there has been a demand for the heat-shrinkable films used in shrink packaging to be capable of handling packaged articles of various shapes and wrapping methods, as well as achieving a film appearance of good design, so in addition to the aforementioned spontaneous shrinkage resistance, the raw materials need to satisfy various physical properties such as low-temperature heat shrinkability, transparency, strength, rigidity and printability.

On the other hand, in order to reduce the burden on the environment, recent years have seen movements to make films thinner (hereinafter referred to as "thinning") to decrease the amount of raw material used and reduce the generation of carbon dioxide, so there is a desire for development of a material emphasizing excellent rigidity and strength capable of withstanding actual use even with thinning.

One means of efficiently raising the rigidity is to mix a vinyl aromatic hydrocarbon polymer or a copolymer consisting of a vinyl aromatic hydrocarbon and an acrylic acid ester into a block copolymer consisting of a vinyl aromatic hydrocarbon and a conjugated diene, as described in Patent Documents 4-6.

When using a vinyl aromatic hydrocarbon polymer, if the compatibility with the block copolymer is insufficient, there is a risk of the transparency and strength decreasing depending on the molding conditions, as well as the glass transition temperature becoming too high. Additionally, when using a copolymer consisting of a vinyl aromatic hydrocarbon and an acrylic acid ester, if the kneading and dispersion in the block copolymer is insufficient, the strength can be reduced, and the resistance to alcohol may be low. Therefore, the development of a material not requiring mixture of these polymers, mainly comprising a block copolymer consisting of vinyl aromatic hydrocarbons and conjugated dienes excelling in rigidity and strength was desired.

Patent Document 1: JP 3543917 B
Patent Document 2: JP 3766820 B
Patent Document 3: JP 3659928 B
Patent Document 4: JP2003-96262 A
Patent Document 5: JP S59-221348 A
Patent Document 6: JP S61-123517 A

SUMMARY OF THE INVENTION

Problems to be Solved by the Invention

The present invention has the purpose of offering a resin composition mainly comprising a block copolymer consisting of a vinyl aromatic hydrocarbon and a conjugated diene, having excellent rigidity and strength enabling the heat-shrinkable film to be thinned, and excelling in the balance of physical properties such as spontaneous shrinkage resistance, low-temperature heat shrinkability and transparency.

The present invention is a resin composition comprising at least one type of block copolymer consisting of a vinyl aromatic hydrocarbon and a conjugated diene, the resin composition (i) having a Vicat softening temperature of 65 to 90° C. measured with a load of 10 N in accordance with ISO306, (ii) having a bending strength of 58 MPa to 80 MPa measured at a test speed of 2 mm/min in accordance with ISO178, (iii) a proportion of the resin composition occupied by the conjugated diene being 10 to 25 mass %, and (iv) a molecular weight distribution of the resin composition having molecular weight peaks from the block copolymers consisting of a vinyl aromatic hydrocarbon and a conjugated diene respectively in the range of molecular weight 70000 to 150000 and in the range of 150000 to 350000; wherein the block copolymer is composed of (I) at least one type of block copolymer in which a proportion of the block copolymer occupied by the conjugated diene is 4 to 15 mass % and (II) at least one type of block copolymer in which a proportion of the block copolymer occupied by the conjugated diene is 28 to 70 mass %; the block copolymer (II) has at least one type of vinyl aromatic hydrocarbon polymer block at a terminus; and a weight ratio between block copolymers (I) and (II) is (I)/(II)=50/50 to 95/5.

The present invention offers a resin composition mainly comprising a block copolymer consisting of a vinyl aromatic hydrocarbon and a conjugated diene, having excellent rigidity and strength enabling thinning, and excelling in the balance of physical properties such as spontaneous shrinkage resistance, low-temperature heat shrinkability and transparency.

MODES FOR CARRYING OUT THE INVENTION

The resin composition of the present invention has a block copolymer consisting of a vinyl aromatic hydrocarbon and a conjugated diene as a main component.

Examples of vinyl aromatic hydrocarbons that can be used in the production of the block copolymer of the present invention include styrene, o-methylstyrene, p-methylstyrene, p-tert-butylstyrene, 2,4-dimethylstyrene, 2,5-dimethylstyrene, α-methylstyrene, vinylnaphthalene and vinylanthracene, among which styrene is preferred.

Examples of conjugated dienes used in the production of the block copolymer of the present invention include 1,3-butadiene, 2-methyl-1,3-butadiene (isoprene), 2,3-dimethyl-1,3-butadiene, 1,3-pentadiene and 1,3-hexadiene, among which 1,3-butadiene and isoprene are preferred.

The block copolymer of the present invention can be produced by polymerizing monomers of vinyl aromatic hydrocarbons and conjugated dienes in a dehydrated organic solvent using an organic lithium compound as an initiator, in the presence of a randomizing agent if needed. The organic solvent may be an aliphatic hydrocarbon such as butane, pentane, hexane, isopentane, heptane, octane and iso-octane, an alicyclic hydrocarbon such as cyclohexane, methylcyclohexane and ethylcyclohexane, or an aromatic hydrocarbon such as benzene, toluene, ethylbenzene and xylene.

The organic lithium compound is a compound having at least one lithium atom bound to the molecule, which may be a monofunctional organic lithium compound such as ethyllithium, n-propyllithium, n-butyllithium, sec-butyllithium or tert-butyllithium, or a polyfunctional organic lithium compound such as hexamethylene dilithium, butadienyl dilithium or isoprenyl dilithium.

While tetrahydrofuran (THF) is mainly used as the randomizing agent, ethers, amines, thioethers, phosphoamides, alkylbenzene sulfonic acid salts and potassium or sodium alkoxides may also be used. Examples of ethers include dimethylether, diethylether, diphenylether, diethylene glycol dimethylether and diethylene glycol dibutylether. The amines may be tertiary amines such as trimethylamine, triethylamine and tetramethylethylene diamine, or alternatively an intracyclic amine. Aside therefrom, triphenylphosphine, hexamethylphosphoramide, potassium or sodium alkylbenzene sulfonate and potassium or sodium butoxide can be used as randomizing agents.

The amount of these randomizing agents added should be 10 parts by mass or less, preferably 0.001 to 8 parts by mass with respect to 100 parts by mass of all added monomers. The time of addition may be before the polymerization reaction, or during polymerization. Additionally, further addition is possible as needed.

To the block copolymer solution obtained in this way is added a polymerization inhibiting agent such as water, alcohol or carbon dioxide in an amount sufficient to inactivate the active terminals, thereby inactivating the block copolymer. The method for recovering the block copolymer from the block copolymer solution may be any method, including a method of pouring these solutions into a poor solvent such as methanol to induce precipitation, a method of vaporizing the solvent with a heating roller or the like to induce precipitation (drum dryer method), a method of concentrating the solution in a concentrator, then removing the solvent with a vent-type extruder, and a method of dispersing the solution in water, then blowing steam to heat and remove the solvent (steam stripping method).

When mixing together a plurality of block copolymers to form the resin composition, the mixing method may be a method of mixing the desolventized block copolymers while melting them in an extruder, or a method of blending solutions of the block copolymers before desolventizing, then desolventizing.

The resin composition of the present invention may contain a filler as needed. Examples of effects obtained by addition of a filler mainly include high strength, thermal insulation, electrical conductivity, insulation, reduced cost, coloring and blocking resistance, and depending on the purpose, an inorganic filler, an organic filler or both may be used. One of the purposes of adding a filler in a film application is for anti-blocking performance.

Examples of a filler having anti-blocking performance include organic fillers such as high-impact polystyrene (HIPS), crosslinked beads of vinyl aromatic hydrocarbon-(meth)acrylic acid ester and/or (meth)acrylic acid copolymer, and crosslinked beads of vinyl aromatic hydrocarbon copolymer, and inorganic fillers such as silica beads and quartz beads. In order to obtain good transparency, HIPS, crosslinked beads of vinyl aromatic hydrocarbon-(meth)acrylic acid ester and/or (meth)acrylic acid copolymer, and crosslinked beads of vinyl aromatic hydrocarbon copolymer should preferably be used. The blending ratio should be no more than 10 parts by mass, preferably 0.05 to 5 parts by mass, and more preferably 0.1 to 3 parts by mass with respect to 100 parts by mass of the resin composition.

The resin composition of the present invention may contain various types of additives as needed. Examples of additives include plasticizers, anti-oxidants, weathering agents, lubricants, anti-static agents, anti-clouding agents and pigments.

Examples of anti-oxidants include phenolic anti-oxidants such as 2-tert-butyl-6-(3-tert-buty-2-hydroxy-5-methylbenzyl)-4-methylphenylacrylate, 2-[1-(2-hydroxy-3,5-di-tert-pentylphenyl)ethyl]-4,6-di-tert-pentylphenylacrylate and n-octadecyl-3-(4-hydroxy-3,5-di-tert-butylphenyl)propionate, and phosphoric antioxidants such as 2,2'-methylenebis(4,6-di-tert-butylphenyl)octylphosphite and tris(2,4-di-tert-butylphenyl)phosphite.

Examples of weathering agents include benzotriazolic UV absorbers such as 2-(2-hydroxy-3-tert-butyl-5-methylphenyl)-5-chlorobenzotriazole and hindered amine type weathering agents such as tetra-cis(2,2,6,6-tetramethyl-4-piperidyl)-1,2,3,4-butane tetracarboxylate. Furthermore, the aforementioned white oils and silicone oils can also be added as weathering agents.

Examples of lubricants include fatty acids, fatty acid esters, fatty acid amides, glycerin fatty acid esters (glycerides), sorbitan fatty acid esters, pentaerythritol fatty acid esters, sucrose fatty acid esters and propylene glycol fatty acid esters, as well as polyethylene waxes, polyolefin waxes such as those of polypropylenes, paraffin waxes, microcrystalline waxes and petrolatum.

As anti-static agents, surfactants such as non-ionic surfactants, anionic surfactants, cationic surfactants and zwitterionic surfactants are mainly used. They may be either kneaded into the resin beforehand or applied to the surface of the formed article after forming.

The resin composition of the present invention has a Vicat softening temperature of 65 to 90° C. as measured with a load of 10 N in accordance with ISO306 (JIS K7026). At less than 65° C., the rate of spontaneous shrinkage is too high, and at more than 90° C., the heat shrinkage rate at low temperatures (especially the heat shrinkage rate at 70 to 80° C.) becomes too low, both cases being undesirable. The resin composition of the present scope can be put to practical use without problems for appropriate applications, but when considering the compatibility to more useful applications, the range of Vicat softening temperatures should preferably be 65 to 85° C., and more preferably 70 to 85° C.

The resin composition of the present invention has a bending strength of 58 to 80 MPa as measured at a testing speed of 2 mm/min in accordance with ISO178 (JIS K7171). At less than 58 MPa, the rigidity of the material is too low, and when thinned, there tend to be problems such as the film not correctly wrapping the packaged article, which is undesirable. Additionally, when exceeding 80 MPa, the proportional content of vinyl aromatic hydrocarbons can become too high, causing the Vicat softening temperature to become too high, consequently reducing the heat shrinkage rate at low temperatures, reducing strength, or both, making the film unsuitable for practical use. While a resin composition in the present range can be put to practical use without problems in appropriate applications, when taking into account the compatibility to more useful applications, the range of bending strengths is more preferably 58 to 75 MPa and even more preferably 60 to 70 MPa. The Vicat softening temperature and bending strength can be controlled by adjusting the weight ratio between vinyl aromatic hydrocarbons and conjugated dienes in random copolymer blocks consisting of vinyl aromatic hydrocarbons and conjugated dienes. Furthermore, adjustments are more easily made by increasing the proportional weight of the block copolymer occupied by random copolymer blocks.

The resin composition of the present invention satisfies the condition that the proportional weight in 100 mass % of the resin composition occupied by the conjugated diene is 10 to 25 mass % as measured by a halogen addition method. If less than 10 mass %, then the strength becomes too low and film rupture tends to occur during film formation, in addition to the fact that it is undesirable in terms of the strength in practical use after packaging. Additionally, at more than 25 mass %, the rigidity of the material is too low, making stable film formation difficult, and causing problems such as the thinned film not correctly wrapping the packaged article, which is undesirable. More preferably, the proportional weight of the conjugated diene is 11 to 22 mass %, more preferably 13 to 22 mass %.

The proportional content occupied by the conjugated diene in the resin composition can be obtained from a general, publicly known halogen addition method. Examples of common halogen addition methods include methods of dissolving in a solvent capable of completely dissolving the sample, then adding an excess quantity of iodine monochloride/carbon tetrachloride, reacting well and titrating the unreacted iodine monochloride with a sodium thiosulfate/ethanol solution, and computing the conjugated diene content from the resulting double bond content.

The molecular weight of the resin composition of the present invention is measured in accordance with conventional methods using gel permeation chromatography (GPC), and the resulting molecular weight distribution has molecular weight peaks from the block copolymer consisting of vinyl aromatic hydrocarbons and conjugated dienes respectively in the range of molecular weights 70000 to 150000 and the range of 150000 to 350000. Preferably, there are molecular weight peaks from the block copolymer consisting of vinyl aromatic hydrocarbons and conjugated dienes respectively in the range of molecular weights 80000 to 150000 and the range of 170000 to 300000. More preferably, there are molecular weight peaks from the block copolymer consisting of vinyl aromatic hydrocarbons and conjugated dienes respectively in the range of molecular weights 90000 to 150000 and the range of 170000 to 280000. In order to achieve a good balance of physical properties, block copolymers having different proportional contents of conjugated dienes are preferably used, such that a block copolymer (a) with a lower proportional content of conjugated dienes should be used in the range of molecular weights 150000 to 350000, and a block copolymer (b) with a higher proportional content of conjugated dienes should be used in the range of molecular weights 70000 to 150000.

In block copolymer (a), the proportion of conjugated dienes in 100 mass % of the block copolymer is preferably 4 to 15 mass %, more preferably 5 to 13 mass %. In block copolymer (b), the proportion of conjugated dienes in 100 mass % of the block copolymer is preferably 28 to 70 mass %, more preferably 29 to 60 mass %.

The block copolymer of the present invention can have any of the following structures in order to achieve the above-described structural properties.
(1) B
(2) A-B
(3) A-B-A
(4) A-C-A
(5) A-B-C-A
(6) A-B-C-B-A
(7) A-C-B-A
(8) $(B)_n$-X
(9) $(A-B)_n$-X
(10) $(A-C)_n$-X
(11) $(A-B-C)_n$-X
(12) $(A-C-B)_n$-X In the above general formulas, A represents a vinyl aromatic hydrocarbon polymer block. The presence of polymer block A can be confirmed from the molecular weight of components obtained by osmic acid decomposition of the block copolymer, in accordance with the literature (the method described in I. M. Kolthoff, et al., *Journal of Polymer Science*, Volume 1, 429 (1946)).

B represents a block wherein vinyl aromatic hydrocarbons and conjugated dienes are randomly arranged. The method of forming block B may be a method of continuously feeding vinyl aromatic hydrocarbons and conjugated dienes at a constant speed ratio to the active terminals while maintaining a starved state, or a method of adding an arbitrary amount of vinyl aromatic hydrocarbons and conjugated dienes all at once.

C represents a conjugated diene polymer block. Additionally, X is a polyfunctional coupler residue or a polyfunctional organic lithium compound residue used as an initiator, and n is an integer of 2 to 10. Examples of polyfunctional couplers include silicon tetrachloride, epoxidized soy oil and organic carboxylic acid esters, and examples of polyfunctional organic lithium compounds include hexamethylene dilithium, butadienyl dilithium and isoprenyl dilithium.

The above-mentioned block copolymer (a) mainly excels in rigidity and low-temperature heat shrinkability. Preferred embodiments thereof may have any of the structures of the following general formulas.
(a-1) B
(a-2) A-B
(a-3) A-B-A
(a-4) $(A-B)_n$-X
(a-5) A-B-C-A
(a-6) A-C-B-A
(a-7) $(A-B-C)_n$-X
(a-8) $(A-C-B)_n$-X The above-mentioned block copolymer (a) preferably has a low proportional weight of blocks mainly composed of conjugated dienes in the structure, in order to ensure that both rigidity and low-temperature heat shrinkability are achieved.

Block copolymer (b) mainly excels in strength. Preferred embodiments thereof may have any of the structures of the following general formulas.
(b-1) A-B-A
(b-2) A-C-A
(b-3) A-B-C-A
(b-4) A-C-B-A
(b-5) A-B-C-B-A
(b-6) $(A-B)_n$-X
(b-7) $(A-C)_n$-X
(b-8) $(A-B-C)_n$-X
(b-9) $(A-C-B)_n$-X The block copolymer (b) preferably has blocks mainly composed of vinyl aromatic hydrocarbons at both ends of the molecular structure in order to obtain strength, and the proportion occupied by its total weight in the weight of the block copolymer should preferably be at least 20 mass %.

The mixing ratio between block copolymer (a) and block copolymer (b) is not particularly limited as long as the resin composition composed mainly thereof satisfies the required physical properties, but in order to achieve a good balance of physical properties, the mixing ratio should preferably be (I)/(II)=50 mass %/50 mass % to 95 mass %/5 mass %, and more preferably (I)/(II)=90 mass %/10 mass % to 55 mass %/45 mass %. When the mixing ratio of the block copolymer (II) exceeds 50 mass %, the rigidity can become too low, and there is an increased risk of the tensile elasticity of the heat shrinkable film consisting of the resin composition becoming lower than 1300 MPa. If less than 5 mass %, the strength can become too low, and there is an increased risk of the elongation of the heat shrinkable film consisting of the resin composition becoming lower than 50%.

While the resin composition of the present invention should preferably be used alone, the method of use is not particularly limited. In actual practice, at least one type of polymer chosen from the following polymers (a) to (c) may be mixed in up to a maximum of 30 mass % as needed within such a range as not to detract from the physical properties:
(a) a vinyl aromatic hydrocarbon polymer;
(b) a copolymer consisting of a vinyl aromatic hydrocarbon and an acrylic acid ester; and
(c) a hydrogenated block copolymer consisting of a vinyl aromatic hydrocarbon and a conjugated diene.

Examples of common vinyl aromatic hydrocarbon polymers include polystyrene, poly-α-methylstyrene and syndiotactic polystyrene.

Examples of acrylic acid esters that may be used in the copolymer consisting of vinyl aromatic hydrocarbons and acrylic acid esters include methyl acrylate, ethyl acrylate, n-propyl acrylate, n-butyl acrylate, isobutyl acrylate, tert-butyl acrylate, isoamyl acrylate, n-hexyl acrylate, (2-ethyl) hexyl acrylate, methyl methacrylate, ethyl methacrylate, n-propyl methacrylate, isopropyl methacrylate, n-butyl methacrylate, isoamyl methacrylate, n-hexyl methacrylate and (2-ethyl)hexyl acrylate. Examples of vinyl aromatic hydrocarbons include styrene, o-methylstyrene, p-methylstyrene, p-tert-butylstyrene, 2,4-dimethylstyrene, 2,5-dimethylstyrene, α-methylstyrene, vinylnaphthalene and vinylanthracene, among which styrene is preferred.

Hydrogenated block copolymers consisting of vinyl aromatic hydrocarbons and conjugated dienes may be obtained by hydrating block copolymers consisting of vinyl aromatic hydrocarbons and conjugated dienes obtained by publicly known methods of polymerization using a hydration catalyst such as a titanocene compound, a reductive organometallic compound, or both.

The mixing ratio of these polymers (a) to (c) preferably does not exceed 30 mass % in which case the strength, transparency or both can be markedly reduced.

The heat-shrinkable film of the present invention may be obtained by uniaxially or multiaxially stretching a sheet or film extruded by a publicly known T-die method or tubular method using the resin composition of the present invention. Examples of uniaxial stretching include a method of stretching the extruded sheet or film in a direction perpendicular to the direction of extrusion using a tenter, a method of stretching the extruded sheet or film in the same direction as the direction of extrusion, a method of stretching the extruded tubular sheet or film in a circumferential direction, and a method of stretching the extruded tubular sheet or film in the same direction as the direction of extrusion. Examples of biaxial stretching include a method of stretching an extruded sheet in the direction of extrusion using a roller, then stretching in the direction perpendicular to the direction of extrusion using a tenter, a method of simultaneously biaxially stretching an extruded sheet with a tenter, and a method of simultaneously or separately stretching an extruded tubular film in the direction of extrusion and the circumferential direction.

The heat-shrinkable film of the present invention may be obtained by solely or mainly using the resin composition of the present invention in at least one layer. The laminar structure of the film may be a single layer or multiple layers. The more the resin composition of the present invention is used, the better.

The heat-shrinkable film of the present invention is not particularly limited as to the thickness of the film that may be used. For example, in shrink labels used for packaging PET bottles, thicknesses of 25 to 60 μm or 30 to 50 μm, such as 40 μm, could be used when considering common printing equipment, printing methods and wrapping methods, but further thinning is possible depending on the method of use of the heat-shrinkable film.

The heat shrinkage rate of the heat-shrinkable film of the present invention is preferably such that the heat shrinkage rate is at least 40% in the main direction of contraction after 10 seconds of immersion in 90° C. hot water, the heat shrinkage rate is at least 50% in the main direction of contraction after 10 seconds of immersion in 100° C. hot water, and more preferably at least 50% at 90° C. and at last 60% at 100° C. If the heat shrinkage rate is too low, there may be wrapping defects depending on the shape of the packaged article, which is undesirable.

The tensile elasticity of the heat-shrinkable film of the present invention is at least 1300 MPa, preferably at least 1400 MPa, more preferably at least 1500 MPa, and most preferably at least 1700 MPa. Since common shrink packaging involves a step of covering a container with a heat-shrinkable film or label in tubular form, the film must have sufficient rigidity to withstand the stress of covering. When used as a thinned film of thickness 40 μm, if the tensile elasticity of the film is less than 1300 MPa, wrapping defects such as the film being bent during covering can occur, which is undesirable.

The elongation of the heat-shrinkable film of the present invention, for practical purposes, is preferably at least 50%, more preferably at least 100%, and even more preferably at least 200%. At less than 50%, the film will often break during use, for example, the film can be broken by the ink solvent when printing, which is undesirable.

The spontaneous shrinkage rate of the heat shrinkable film of the present invention, for practical purposes, should be 2% or less, more preferably 1.6% or less after storage for 7 days at 40° C. If the spontaneous shrinkage rate exceeds 2%, then if, for example, the film is stored in a high-temperature environment that is not temperature-controlled, the film may tend to develop defects in appearance such as waving, which is undesirable for practical purposes.

The haze (clouding) in the heat-shrinkable film of the present invention should be 10% or less, preferably 8% or less, more preferably 6% or less. At more than 10%, the appearance of the film becomes very poor, which is undesirable.

The heat-shrinkable film using the resin composition of the present invention may be used in various packaging formats including heat-shrink labels, heat-shrink cap seals and overpack film.

EXAMPLES

The present invention will be explained in detail by providing examples below, but the present invention is not to be construed as being limited by these examples.

Production Methods of Block Copolymers (A) to (P) of Reference Examples 1 to 16

Reference Example 1

Production Method of Block Copolymer (A)

(1) 327 kg of cyclohexane were loaded into a reaction chamber.
(2) While stirring at an internal temperature of 30° C., 950 mL of n-butyllithium (10 mass % cyclohexane solution) were added, 70.0 kg of styrene monomer were added, and the temperature was raised to polymerize.
(3) At an internal temperature of 50° C., 70.0 kg of styrene monomer were added to complete the polymerization.

Reference Example 2

Production Method of Block Copolymer (B)

(1) 500 kg of cyclohexane were loaded into a reaction chamber.
(2) While stirring at an internal temperature of 30° C., 1160 mL of n-butyllithium (10 mass % cyclohexane solution) were added, 4.0 kg of styrene monomer were added, and the temperature was raised to polymerize.
(3) While maintaining the internal temperature at 80° C., a total of 90.0 kg of styrene monomer and a total of 10.0 kg of butadiene monomer were both simultaneously added at constant addition rates of respectively 10.0 kg/h and 90.0 kg/h, and this state was maintained for a sufficient period of time after the addition was completed.
(4) At an internal temperature of 55° C., 48.0 kg of styrene monomer were added to polymerize.
(5) At an internal temperature of 70° C., 48.0 kg of styrene monomer were added to complete the polymerization.

Reference Example 3

Production Method of Block Copolymer (C)

(1) 500 kg of cyclohexane were loaded into a reaction chamber.
(2) While stirring at an internal temperature of 30° C., 1210 mL of n-butyllithium (10 mass % cyclohexane solution) were added, 8.0 kg of styrene monomer were added, and the temperature was raised to polymerize.
(3) While maintaining the internal temperature at 80° C., a total of 172.0 kg of styrene monomer and a total of 12.0 kg of butadiene monomer were both simultaneously added at constant addition rates of respectively 172.0 kg/h and 12.0 kg/h, and this state was maintained for a sufficient period of time after the addition was completed.
(4) At an internal temperature of 75° C., 8.0 kg of styrene monomer were added to complete the polymerization.

Reference Example 4

Production Method of Block Copolymer (D)

(1) 500 kg of cyclohexane were loaded into a reaction chamber.
(2) While stirring at an internal temperature of 30° C., 1710 mL of n-butyllithium (10 mass % cyclohexane solution) were added, 16.0 kg of styrene monomer were added, and the temperature was raised to polymerize.
(3) While maintaining the internal temperature at 80° C., a total of 172.0 kg of styrene monomer and a total of 12.0 kg of butadiene monomer were both simultaneously added at constant addition rates of respectively 172.0 kg/h and 12.0 kg/h, and this state was maintained for a sufficient period of time after the addition was completed.
(4) At an internal temperature of 80° C., a total of 187 g of epoxidized soy oil (Adeka Adekacizer O-130P) were added, then stirred for 10 minutes at 75° C. to complete the polymerization.

Reference Example 5

Production Method of Block Copolymer (E)

(1) 500 kg of cyclohexane were loaded into a reaction chamber.
(2) While stirring at an internal temperature of 30° C., 1050 mL of n-butyllithium (10 mass % cyclohexane solution) were added, 40.0 kg of styrene monomer were added, and the temperature was raised to polymerize.
(3) While maintaining the internal temperature at 80° C., a total of 102.0 kg of styrene monomer and a total of 18.0 kg of butadiene monomer were both simultaneously added at constant addition rates of respectively 153.0 kg/h and 27.0 kg/h, and this state was maintained for a sufficient period of time after the addition was completed.
(4) At an internal temperature of 70° C., 40.0 kg of styrene monomer were added to complete the polymerization.

Reference Example 6

Production Method of Block Copolymer (F)

(1) 500 kg of cyclohexane were loaded into a reaction chamber.
(2) While stirring at an internal temperature of 30° C., 1200 mL of n-butyllithium (10 mass % cyclohexane solution) were added, 40.0 kg of styrene monomer were added, and the temperature was raised to polymerize.
(3) While maintaining the internal temperature at 80° C., a total of 98.0 kg of styrene monomer and a total of 22.0 kg of butadiene monomer were both simultaneously added at constant addition rates of respectively 147.0 kg/h and 33.0 kg/h, and this state was maintained for a sufficient period of time after the addition was completed.
(4) At an internal temperature of 70° C., 40.0 kg of styrene monomer were added to complete the polymerization.

Reference Example 7

Production Method of Block Copolymer (G)

(1) 500 kg of cyclohexane were loaded into a reaction chamber.
(2) While stirring at an internal temperature of 30° C., 1090 mL of n-butyllithium (10 mass % cyclohexane solution) were added, 8.0 kg of styrene monomer were added, and the temperature was raised to polymerize.
(3) While maintaining the internal temperature at 80° C., a total of 156.0 kg of styrene monomer and a total of 28.0 kg of butadiene monomer were both simultaneously added at constant addition rates of respectively 156.0 kg/h and 28.0 kg/h, and this state was maintained for a sufficient period of time after the addition was completed.
(4) At an internal temperature of 70° C., 8.0 kg of styrene monomer were added to complete the polymerization.

Reference Example 8

Production Method of Block Copolymer (H)

(1) 500 kg of cyclohexane were loaded into a reaction chamber.
(2) While stirring at an internal temperature of 30° C., 1230 mL of n-butyllithium (10 mass % cyclohexane solution) were added, 8.0 kg of styrene monomer were added, and the temperature was raised to polymerize.

(3) While maintaining the internal temperature at 80° C., a total of 110.0 kg of styrene monomer and a total of 13.4 kg of butadiene monomer were both simultaneously added at constant addition rates of respectively 87.8 kg/h and 10.7 kg/h, and this state was maintained for a sufficient period of time after the addition was completed.
(4) At an internal temperature of 75° C., 18.6 kg of styrene monomer were added to polymerize.
(5) The temperature was lowered, and 50.0 kg of styrene monomer were added to complete the polymerization.

Reference Example 9

Production Method of Block Copolymer (I)

(1) 500 kg of cyclohexane were loaded into a reaction chamber.
(2) While stirring at an internal temperature of 30° C., 1320 mL of n-butyllithium (10 mass % cyclohexane solution) were added, 8.0 kg of styrene monomer were added, and the temperature was raised to polymerize.
(3) While maintaining the internal temperature at 80° C., a total of 109.8 kg of styrene monomer and a total of 34.2 kg of butadiene monomer were both simultaneously added at constant addition rates of respectively 87.8 kg/h and 27.3 kg/h, and this state was maintained for a sufficient period of time after the addition was completed.
(4) At an internal temperature of 70° C., 48.0 kg of styrene monomer were added to complete the polymerization.

Reference Example 10

Production Method of Block Copolymer (J)

(1) 500 kg of cyclohexane were loaded into a reaction chamber.
(2) While stirring at an internal temperature of 30° C., 1620 mL of n-butyllithium (10 mass % cyclohexane solution) were added, 4.0 kg of styrene monomer were added, and the temperature was raised to polymerize.
(3) While maintaining the internal temperature at 80° C., a total of 110.6 kg of styrene monomer and a total of 8.8 kg of butadiene monomer were both simultaneously added at constant addition rates of respectively 165.9 kg/h and 13.2 kg/h, and this state was maintained for a sufficient period of time after the addition was completed.
(4) At an internal temperature of 65° C., 42.6 kg of styrene monomer were added to polymerize.
(5) The temperature was lowered, and 34.0 kg of styrene monomer were added to complete the polymerization.

Reference Example 11

Production Method of Block Copolymer (K)

(1) 500 kg of cyclohexane were loaded into a reaction chamber.
(2) While stirring at an internal temperature of 30° C., 1960 mL of n-butyllithium (10 mass % cyclohexane solution) were added, 4.0 kg of styrene monomer were added, and the temperature was raised to polymerize.
(3) While maintaining the internal temperature at 80° C., a total of 103.8 kg of styrene monomer and a total of 6.8 kg of butadiene monomer were both simultaneously added at constant addition rates of respectively 140.4 kg/h and 9.2 kg/h, and this state was maintained for a sufficient period of time after the addition was completed.
(4) At an internal temperature of 60° C., 51.4 kg of styrene monomer were added to polymerize.
(5) At an internal temperature of 70° C., 34.0 kg of styrene monomer were added to complete the polymerization.

Reference Example 12

Production Method of Block Copolymer (L)

(1) 500 kg of cyclohexane were loaded into a reaction chamber.
(2) While stirring at an internal temperature of 30° C., 3940 mL of n-butyllithium (10 mass % cyclohexane solution) were added, 20.0 kg of styrene monomer were added, and the temperature was raised to polymerize.
(3) While maintaining the internal temperature at 80° C., a total of 105.0 kg of styrene monomer and a total of 13.0 kg of butadiene monomer were both simultaneously added at constant addition rates of respectively 80.8 kg/h and 10.0 kg/h, and this state was maintained for a sufficient period of time after the addition was completed.
(4) At an internal temperature of 55° C., 54.0 kg of styrene monomer were added to polymerize.
(5) At an internal temperature of 85° C., 8.0 kg of styrene monomer were added to complete the polymerization.
(6) At an internal temperature of 85° C., a total of 423 g of epoxidized soy oil (Adeka Adekacizer 0-130P) were added, then stirred for 10 minutes at 75° C. to complete the polymerization.

Reference Example 13

Production Method of Block Copolymer (M)

(1) 500 kg of cyclohexane were loaded into a reaction chamber.
(2) While stirring at an internal temperature of 30° C., 2210 mL of n-butyllithium (10 mass % cyclohexane solution) were added, 40.0 kg of styrene monomer were added, and the temperature was raised to polymerize.
(3) While maintaining the internal temperature at 80° C., a total of 36.0 kg of styrene monomer and a total of 8.0 kg of butadiene monomer were both simultaneously added at constant addition rates of respectively 144.0 kg/h and 32.0 kg/h, and this state was maintained for a sufficient period of time after the addition was completed.
(4) At an internal temperature of 55° C., 66.0 kg of styrene monomer were added to polymerize.
(5) At an internal temperature of 65° C., 50.0 kg of styrene monomer were added to complete the polymerization.

Reference Example 14

Production Method of Block Copolymer (N)

(1) 500 kg of cyclohexane were loaded into a reaction chamber.
(2) While stirring at an internal temperature of 30° C., 2310 mL of n-butyllithium (10 mass % cyclohexane solution) were added, 50.0 kg of styrene monomer were added, and the temperature was raised to polymerize.
(3) While maintaining the internal temperature at 80° C., a total of 34.2 kg of styrene monomer and a total of 11.8 kg of butadiene monomer were both simultaneously added at constant addition rates of respectively 58.6 kg/h and 20.2 kg/h, and this state was maintained for a sufficient period of time after the addition was completed.
(4) At an internal temperature of 55° C., 40.0 kg of styrene monomer were added to polymerize.

(5) At an internal temperature of 55° C., 39.8 kg of styrene monomer and 24.2 kg of butadiene monomer were added at once to complete the polymerization.

Reference Example 15

Production Method of Block Copolymer (O)

(1) 500 kg of cyclohexane were loaded into a reaction chamber.
(2) While stirring at an internal temperature of 30 CC 2700 mL of n-butyllithium (10 mass % cyclohexane solution) were added, 37.0 kg of styrene monomer were added, and the temperature was raised to polymerize.
(3) While maintaining the internal temperature at 80° C., a total of 6.0 kg of styrene monomer and a total of 120.0 kg of butadiene monomer were both simultaneously added at constant addition rates of respectively 4.0 kg/h and 80.0 kg/h, and this state was maintained for a sufficient period of time after the addition was completed.
(4) At an internal temperature of 70° C., 37.0 kg of styrene monomer were added to complete the polymerization.

Reference Example 16

Production Method of Block Copolymer (P)

(1) 500 kg of cyclohexane were loaded into a reaction chamber.
(2) While stirring at an internal temperature of 30° C., 3480 mL of n-butyllithium (10 mass % cyclohexane solution) were added, 23.0 kg of styrene monomer were added, and the temperature was raised to polymerize.
(4) At an internal temperature of 55° C., 50.0 kg of butadiene monomer were added to polymerize.
(5) At an internal temperature of 55° C., 50.0 kg of butadiene monomer were added to polymerize.
(6) At an internal temperature of 55° C., 54.0 kg of butadiene monomer were added to complete the polymerization.
(7) At an internal temperature of 70° C., 23.0 kg of butadiene monomer were added to complete the polymerization.

The structural characteristics of block copolymers A to P obtained in this way are shown in Tables 1 and 2. The conjugated diene content in the block copolymer, Vicat softening temperature, bending strength and molecular weight were measured in accordance with the methods described below.

TABLE 11

|  | Ref. Ex. 1 | Ref. Ex. 2 | Ref. Ex. 3 | Ref. Ex. 4 | Ref. Ex. 5 | Ref. Ex. 6 | Ref. Ex. 7 | Ref. Ex. 8 | Ref. Ex. 9 |
|---|---|---|---|---|---|---|---|---|---|
| Block copol. abbreviation | (A) | (B) | (C) | (D) | (E) | (F) | (G) | (H) | (I) |
| Block copol. type | — | (a) | (a) | (a) | (a) | (a) | (a) | — | — |
| Block copol. structure | A | A-B-A | A-B-A | $(A-B)_n$-X | A-B-A | A-B-A | A-B-A | A-B-C-A | A-B-A |
| Conjugated diene content of block copol. [mass %] | 0 | 5 | 6 | 6 | 9 | 11 | 14 | 16 | 17 |
| Vicat softening temperature of block copol. [° C.] | 107 | 86 | 84 | 84 | 74 | 71 | 62 | 75 | 59 |
| Bending strength of block copol. [MPa] | 106 | 91 | 84 | 87 | 84 | 85 | 76 | 68 | 58 |
| Peak top mol. wt. of main component in range of mol. wt. 70000 to 150000 [g/mol] | — | — | — | 128000 | — | — | — | — | — |
| Peak top mol. wt. of main component in range of mol. wt. 150000 to 350000 [g/mol] | 156000 | 201000 | 187000 | 268000 | 231000 | 224000 | 222000 | 206000 | 180000 |

TABLE 2

|  | Ref. Ex. 10 | Ref. Ex. 11 | Ref. Ex. 12 | Ref. Ex. 13 | Ref. Ex. 14 | Ref. Ex. 15 | Ref. Ex. 16 |
|---|---|---|---|---|---|---|---|
| Block copol. abbreviation | (J) | (K) | (L) | (M) | (N) | (O) | (P) |
| Block copol. type | — | (b) | (b) | (b) | (b) | (b) | — |
| Block copol. structure | A-B-C-A | A-B-C-A | $(A-B-C)_n$-X | A-B-C-A | A-B-C-B-A | A-B-A | A-C-A |
| Conjugated diene content of block copol. [mass %] | 26 | 29 | 34 | 37 | 38 | 60 | 77 |

TABLE 2-continued

|  | Ref. Ex. 10 | Ref. Ex. 11 | Ref. Ex. 12 | Ref. Ex. 13 | Ref. Ex. 14 | Ref. Ex. 15 | Ref. Ex. 16 |
|---|---|---|---|---|---|---|---|
| Vicat softening temperature of block copol. [° C.] | 78 | 77 | 61 | 68 | 56 | <0 | <0 |
| Bending strength of block copol. [MPa] | 46 | 42 | 32 | 32 | 21 | 6 | n/a |
| Peak top mol. wt. of main component in range of mol. wt. 70000 to 150000 [g/mol] | — | 145000 | 130000 | 125000 | 121000 | 124000 | 90000 |
| Peak top mol. wt. of main component in range of mol. wt. 150000 to 350000 [g/mol] | 168000 | — | 187000 | — | — | — | — |

[Measurement of Conjugated Diene Content]

The measurement of block copolymers and the mass % of conjugated dienes in 100 mass % of the resin composition was performed by the following method.
(1) 0.1 g of a sample was dissolved in 50 mL of chloroform.
(2) 25 mL of an iodine monochloride/carbon tetrachloride solution were added and mixed well, after which the solution was let stand for one hour in a dark place.
(3) 75 mL of a 2.5% potassium iodide solution were added and mixed well.
(4) A 20% sodium thiosulfate/ethanol solution was added while stirring well until the color of the solution became a pale yellowish color.
(5) About 0.5 mL of a 1% starch indicator was added, and titration was performed with the 20% sodium thiosulfate/ethanol solution once again until the solution became colorless.
(6) After titration was completed, the amount a [mL] of the sodium thiosulfate/ethanol solution that was consumed was measured.

In order to make corrections by measuring blanks, the operations of steps (1) to (6) were performed for straight chloroform, and the amount b [mL] of sodium thiosulfate/ethanol consumed was measured.

The conjugated diene content was computed from the measurements in accordance with the following formula.

$$\text{Conjugated diene content (\%)} = [(b-a) \times 0.1 \times c \times 27/1000]/W \times 100$$

c: titer of 20% sodium thiosulfate/ethanol solution
W: amount of sample [g]

[Measurement of Vicat Softening Temperature]

The Vicat softening temperatures of the block copolymer and resin composition were measured with a load of 10 N in accordance with ISO306 (JIS K7206) using a 148 HAD Heat Distortion Tester (Yasuda Seiki Seisakusho).

[Measurement of Bending Strength]

The bending strengths of the block copolymer and resin composition were measured as the maximum bending stress (bending strength) capable of being withstood by a test piece when measured at a testing speed of 2 mm/mm in accordance with ISO178 (JIS K7171) using a Bendograph H (Toyo Seiki).

[Measurement of Molecular Weight]

The molecular weights of the block copolymer and resin composition were measured using the GPC measuring device and conditions given below.
Device name: High-speed GPC apparatus HLC-8220 (Tosoh)
Column: PL gel Mixed-B, three in series
Temperature: 40° C.
Detection: differential refractive index
Solvent: tetrahydrofuran
Concentration: 2 wt %
Calibration curve: The compounds were produced using a standard polystyrene (PL) and the peak molecular weights of the main components having molecular weight peaks in the ranges of molecular weight 70000 to 150000 and 150000 to 350000 were measured as polystyrene-converted values. Additionally, the weight-average molecular weights were also measured based on similar measuring conditions, and measured as polystyrene-converted values.

The above-described block copolymers 1 to 16 were used singly or after well pellet-blending (dry blending) two or more types, then melt-mixed at a melt temperature of 200° C. using a uniaxial screw (screw diameter 40 mm, Dulmage type) extruder manufactured by Tabata Industrial Machinery to form the resin compositions of Table 3 to Table 6. The conjugated diene content in the resin composition, Vicat softening temperature, bending strength and molecular weight were measured in accordance with the above-described methods.

Next, the resin compositions of Table 3 to Table 6 were extruded into sheets with an average thickness of about 0.22 mm while melting at 200° C. using a T-die type uniaxial extruder (screw diameter 65 mm, Dulmage type), then stretched 1.2-fold in the direction of sheet flow (hereinafter referred to as MD) while heating to a stretching temperature, then stretched 4.5-fold while heating to the stretching temperature in a direction perpendicular (hereinafter referred to as TD) to the direction of sheet flow using a tenter stretcher to obtain a heat-shrinkable film of average thickness 40 µm. The physical properties of the resulting film were measured in accordance with the methods described below, and shown together in Table 3 to Table 6.

[Measurement of Heat Shrinkage Rate]

The heat shrinkage rate was measured by the following method.
(1) A test piece of MD width 100 mm and TD width 100 mm was cut out from a stretched film.

(2) This test piece was completely immersed for 10 seconds in 100° C. hot water, then immediately water-cooled. The water was wiped from the test piece after water-cooling, and the length L (mm) in the TD was measured.
(3) The heat shrinkage rate was computed by the following formula.

Heat shrinkage rate (%)={(100.0−L)/100.0}×100

[Measurement of Tensile Elasticity and Tensile Elongation]
The tensile elasticity and tensile elongation were measured according to the following methods.
(1) A strip-shaped test piece of MD width 100 mm and TD width 10 mm was cut out from a stretched film.
(2) Using an Orientec Tensilon Universal Material Testing Instrument, the cut out test piece was pulled in the MD at a measurement temperature of 23° C. and a tension speed of 200 mm/min to measure the tensile elasticity and the tensile elongation.

[Measurement of Spontaneous Shrinkage Rate]
The spontaneous shrinkage rate was measured by the following method.
(1) A test piece of MD width 100 mm and TD width 350 mm was cut out from a stretched film.
(2) At a central portion of the test piece, marker lines were made with the spacing between the marker lines in the TD set to 300 mm. The test piece was then stored in a 40° C. environmental tester, and the spacing N (mm) between the marker lines was measured after 7 days of storage.
(3) The spontaneous shrinkage rate was measured by the following formula.

Spontaneous shrinkage rate (%)=((300.0−L)/300.0)×100

[Measurement of Haze]
The haze was measured by the methods described below.
(1) A test piece of MD width 50 mm and TD width 100 mm was cut out from a stretched film.
(2) The haze of the film was measured using a Nippon Denshoku Industries NDH2000 Turbidimeter.

TABLE 3

| | | Ex. 1 | Ex. 2 | Ex. 3 | Ex. 4 | Ex. 5 | Ex. 6 | Ex. 7 |
|---|---|---|---|---|---|---|---|---|
| Resin Content | Block copolymer (abbrev.) | (C) | (D) | (E) | (C) | (B) | (B) | (C) |
| | Content [mass %] | 33.3 | 66.7 | 95 | 33.3 | 50 | 66.7 | 66.7 |
| | Block copolymer (abbrev.) | (F) | (M) | (P) | (G) | (M) | (N) | (K) |
| | Content [mass %] | 33.3 | 33.3 | 5 | 33.3 | 50 | 33.3 | 33.3 |
| | Block copolymer (abbrev.) | (N) | | | (M) | | | |
| | Content [mass %] | 33.4 | | | 33.4 | | | |
| Resin Characteristics | Conjugated diene content in resin composition [mass %] | 18 | 17 | 12 | 19 | 21 | 16 | 14 |
| | Vicat softening temperature of resin composition [° C.] | 73 | 80 | 74 | 72 | 79 | 81 | 85 |
| | Bending strength of resin composition [MPa] | 60 | 67 | 82 | 64 | 59 | 64 | 71 |
| | Peak top mol. wt. of main component in range of mol. wt. 70000-150000 | 124000 | 126000 | 125000 | 145000 | 124000 | 123000 | 144000 |
| | Peak top mol. wt. of main component in range of mol. wt. 150000-350000 | 193000 | 270000 | 253000 | 204000 | 201000 | 201000 | 188000 |
| Stretched Film Properties | Stretching temperature [° C.] | 90 | 90 | 90 | 90 | 90 | 90 | 90 |
| | Heat shrinkage rate after 10 sec. immersion in 70° C. hot water [%] | 10 | 5 | 8 | 12 | 11 | 6 | 5 |
| | Heat shrinkage rate after 10 sec. immersion in 80° C. hot water [%] | 41 | 22 | 37 | 51 | 30 | 22 | 19 |
| | Heat shrinkage rate after 10 sec. immersion in 90° C. hot water [%] | 66 | 65 | 64 | 73 | 62 | 57 | 54 |
| | Heat shrinkage rate after 10 sec. immersion in 100° C. hot water [%] | 72 | 72 | 72 | 77 | 73 | 70 | 68 |
| | Tensile elasticity in longitudinal direction [MPa] | 1350 | 1540 | 1880 | 1450 | 1320 | 1500 | 1600 |
| | Tensile elongation in longitudinal direction [%] | 350 | 290 | 50 | 260 | 320 | 250 | 180 |
| | Spontaneous shrinkage rate after storage for 7 days at 40° C. [%] | 1.9 | 1.7 | 1.4 | 1.6 | 1.8 | 1.6 | 1.4 |
| | Haze [%] | 6 | 6 | 5.4 | 4.4 | 4.1 | 9.0 | 4.6 |

TABLE 4

| | | Ex. 8 | Ex. 9 | Ex. 10 | Ex. 11 | Ex. 12 |
|---|---|---|---|---|---|---|
| Resin Content | Block copolymer (abbrev.) | (F) | (B) | (B) | (G) | (G) |
| | Content [mass %] | 33.3 | 50 | 90 | 50 | 95 |
| | Block copolymer (abbrev.) | (G) | (K) | (O) | (K) | (O) |
| | Content [mass %] | 33.3 | 50 | 10 | 50 | 5 |
| | Block copolymer (abbrev.) | (L) | | | | |
| | Content [mass %] | 33.4 | | | | |
| Resin Characteristics | Conjugated diene content in resin composition [mass %] | 20 | 17 | 11 | 22 | 14 |
| | Vicat softening temperature of resin composition [° C.] | 66 | 81 | 85 | 69 | 69 |
| | Bending strength of resin composition [MPa] | 59 | 61 | 84 | 59 | 80 |
| | Peak top mol. wt. of main component in range of mol. wt. 70000-150000 | 131000 | 144000 | 125000 | 144000 | 125000 |

TABLE 4-continued

|  |  | Ex. 8 | Ex. 9 | Ex. 10 | Ex. 11 | Ex. 12 |
|---|---|---|---|---|---|---|
|  | Peak top mol. wt. of main component in range of mol. wt. 150000-350000 | 223000 | 199000 | 202000 | 224000 | 220000 |
| Stretched Film Properties | Stretching temperature [° C.] | 90 | 90 | 90 | 90 | 90 |
|  | Heat shrinkage rate after 10 sec. immersion in 70° C. hot water [%] | 38 | 6 | 5 | 21 | 24 |
|  | Heat shrinkage rate after 10 sec. immersion in 80° C. hot water [%] | 61 | 25 | 20 | 55 | 55 |
|  | Heat shrinkage rate after 10 sec. immersion in 90° C. hot water [%] | 75 | 60 | 56 | 74 | 75 |
|  | Heat shrinkage rate after 10 sec. immersion in 100° C. hot water [%] | 78 | 73 | 69 | 77 | 77 |
|  | Tensile elasticity in longitudinal direction [MPa] | 1350 | 1370 | 1900 | 1320 | 1800 |
|  | Tensile elongation in longitudinal direction [%] | 370 | 220 | 50 | 270 | 80 |
|  | Spontaneous shrinkage rate after storage for 7 days at 40° C. [%] | 1.5 | 1.5 | 2 | 1.6 | 1.5 |
|  | Haze [%] | 6.2 | 5.7 | 8.8 | 4.3 | 6.5 |

TABLE 5

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Resin Content | Block copolymer (abbrev.) | (H) | (A) | (I) | (A) | (A) | (I) |
|  | Content [mass %] | 66.7 | 66.7 | 80 | 90 | 95 | 80 |
|  | Block copolymer (abbrev.) | (J) | (J) | (P) | (D) | (O) | (K) |
|  | Content [mass %] | 33.3 | 33.3 | 20 | 10 | 5 | 20 |
| Resin Characteristics | Conjugated diene content in resin composition [mass %] | 19 | 9 | 15 | 8 | 3 | 21 |
|  | Vicat softening temperature of resin composition [° C.] | 76 | 97 | 57 | 103 | 105 | 63 |
|  | Bending strength of resin composition [MPa] | 58 | 76 | 49 | 76 | 87 | 57 |
|  | Peak top mol. wt. of main component in range of mol. wt. 70000-150000 | — | 123000 | 90000 | 73000 | 124000 | 144000 |
|  | Peak top mol. wt. of main component in range of mol. wt. 150000-350000 | 205000 | 155000 | 182000 | 157000 | 158000 | 180000 |
| Stretched Film Properties | Stretching temperature [° C.] | 90 | — | 70 | — | — | 75 |
|  | Heat shrinkage rate after 10 sec. immersion in 70° C. hot water [%] | 9 | too soft to form a film | 46 | too soft to form a film | too soft to form a film | 40 |
|  | Heat shrinkage rate after 10 sec. immersion in 80° C. hot water [%] | 35 |  | 70 |  |  | 68 |
|  | Heat shrinkage rate after 10 sec. immersion in 90° C. hot water [%] | 63 |  | 76 |  |  | 75 |
|  | Heat shrinkage rate after 10 sec. immersion in 100° C. hot water [%] | 75 |  | 77 |  |  | 76 |
|  | Tensile elasticity in longitudinal direction [MPa] | 1280 |  | 1100 |  |  | 1240 |
|  | Tensile elongation in longitudinal direction [%] | 200 |  | 400< |  |  | 290 |
|  | Spontaneous shrinkage rate after storage for 7 days at 40° C. [%] | 2.3 |  | 10.7 |  |  | 7.8 |
|  | Haze [%] | 4.4 |  | 26.4 |  |  | 6.6 |

TABLE 6

|  |  | Comp. Ex. 7 | Comp. Ex. 8 | Comp. Ex. 9 | Comp. Ex. 10 | Comp. Ex. 11 |
|---|---|---|---|---|---|---|
| Resin Content | Block copolymer (abbrev.) | (B) | (G) | (F) | (N) | (C) |
|  | Content [mass %] | 70 | 50 | 100 | 100 | 40 |
|  | Block copolymer (abbrev.) | (P) | (J) |  |  | (L) |
|  | Content [mass %] | 30 | 50 |  |  | 60 |
| Resin Characteristics | Conjugated diene content in resin composition [mass %] | 27 | 20 | 11 | 38 | 23 |
|  | Vicat softening temperature of resin composition [° C.] | 73 | 69 | 71 | 56 | 68 |
|  | Bending strength of resin composition [MPa] | 61 | 62 | 85 | 22 | 51 |
|  | Peak top mol. wt. of main component in range of mol. wt. 70000-150000 | 91000 | — | — | 120000 | 130000 |

TABLE 6-continued

|  |  | Comp. Ex. 7 | Comp. Ex. 8 | Comp. Ex. 9 | Comp. Ex. 10 | Comp. Ex. 11 |
|---|---|---|---|---|---|---|
|  | Peak top mol. wt. of main component in range of mol. wt. 150000-350000 | 202000 | 168000, 220000 | 224000 | — | 188000 |
| Stretched Film Properties | Stretching temperature [° C.] | 90 | 90 | — | — | 85 |
|  | Heat shrinkage rate after 10 sec. immersion in 70° C. hot water [%] | 13 | 20 | too soft to form a film | too soft to form a film | 30 |
|  | Heat shrinkage rate after 10 sec. immersion in 80° C. hot water [%] | 35 | 54 |  |  | 67 |
|  | Heat shrinkage rate after 10 sec. immersion in 90° C. hot water [%] | 57 | 72 |  |  | 74 |
|  | Heat shrinkage rate after 10 sec. immersion in 100° C. hot water [%] | 68 | 76 |  |  | 77 |
|  | Tensile elasticity in longitudinal direction [MPa] | 1290 | 1390 |  |  | 1120 |
|  | Tensile elongation in longitudinal direction [%] | 150 | 20 |  |  | 400< |
|  | Spontaneous shrinkage rate after storage for 7 days at 40° C. [%] | 8.9 | 1.7 |  |  | 4.6 |
|  | Haze [%] | 23.2 | 4.6 |  |  | 6.7 |

Next, the resin compositions of the examples were mixed with vinyl aromatic hydrocarbon polymers, copolymers consisting of vinyl aromatic hydrocarbons and acrylic acid esters, or hydrogenated block copolymers consisting of vinyl aromatic hydrocarbons and conjugated dienes to form resin compositions. The structural characteristics of the polymers used for mixing are shown in Table 7, and the physical properties of the resin compositions mixed with the polymers are shown in Table 8 and Table 9.

TABLE 7

| Polymer Abbreviation | (a) | (b) | (c) |
|---|---|---|---|
| Polymer Structure | polystyrene | styrene-n-butyl acrylate copolymer | hydrogenated styrene-butadiene block copolymer |
| Polymer Composition | butadiene 0 mass % | n-butyl acrylate 17 mass % | pre-hydrogenated butadiene 24 mass % hydration rate 99% |
| Weight-Average Molecular Weight (Mw) | 260000 | 420000 | 160000 |

TABLE 8

|  |  | Ex. 13 | Ex. 14 | Ex. 15 | Ex. 16 | Ex. 17 | Ex. 18 |
|---|---|---|---|---|---|---|---|
| Resin Content | Type of resin composition | Ex. 11 | Ex. 8 | Ex. 1 | Ex. 5 | Ex. 3 | Ex. 7 |
|  | Content [mass %] | 90 | 75 | 85 | 80 | 95 | 85 |
|  | Block copolymer (abbrev.) | (a) | (a) | (b) | (b) | (c) | (c) |
|  | Content [mass %] | 10 | 25 | 15 | 20 | 5 | 15 |
| Resin Characteristics | Conjugated diene content in resin composition [mass %] | 19 | 15 | 16 | 17 | 11 | 12 |
|  | Vicat softening temperature of resin composition [° C.] | 72 | 76 | 73 | 77 | 74 | 83 |
|  | Bending strength of resin composition [MPa] | 62 | 68 | 65 | 66 | 75 | 62 |
| Stretched Film Properties | Stretching temperature [° C.] | 90 | 90 | 90 | 90 | 90 | 90 |
|  | Heat shrinkage rate after 10 sec. immersion in 70° C. hot water [%] | 10 | 10 | 9 | 9 | 10 | 8 |
|  | Heat shrinkage rate after 10 sec. immersion in 80° C. hot water [%] | 50 | 37 | 42 | 35 | 40 | 32 |
|  | Heat shrinkage rate after 10 sec. immersion in 90° C. hot water [%] | 72 | 68 | 69 | 65 | 67 | 65 |
|  | Heat shrinkage rate after 10 sec. immersion in 100° C. hot water [%] | 76 | 72 | 75 | 72 | 71 | 72 |
|  | Tensile elasticity in longitudinal direction [MPa] | 1380 | 1550 | 1500 | 1520 | 1700 | 1400 |
|  | Tensile elongation in longitudinal direction [%] | 200 | 200 | 260 | 220 | 80 | 280 |
|  | Spontaneous shrinkage rate after storage for 7 days at 40° C. [%] | 1.6 | 1.4 | 1.7 | 1.7 | 1.5 | 1.9 |
|  | Haze [%] | 5.5 | 7.0 | 8.5 | 7.7 | 6.2 | 8.8 |

TABLE 9

|  |  | Comp. Ex. 12 | Comp. Ex. 13 | Comp. Ex. 14 |
|---|---|---|---|---|
| Resin Content | Type of resin composition | Ex. 7 | Ex. 10 | Ex. 12 |
|  | Content [mass %] | 65 | 66.7 | 60 |
|  | Block copolymer (abbrev.) | (a) | (b) | (c) |
|  | Content [mass %] | 35 | 33.3 | 40 |
| Resin Characteristics | Conjugated diene content in resin composition [mass %] | 9 | 7 | 8 |
|  | Vicat softening temperature of resin composition [° C.] | 86 | 80 | 58 |
|  | Bending strength of resin composition [MPa] | 75 | 91 | 52 |
| Stretched Film Properties | Stretching temperature [° C.] | 95 | 90 | 70 |
|  | Heat shrinkage rate after 10 sec. immersion in 70° C. hot water [%] | 7 | 6 | 40 |
|  | Heat shrinkage rate after 10 sec. immersion in 80° C. hot water [%] | 16 | 24 | 68 |
|  | Heat shrinkage rate after 10 sec. immersion in 90° C. hot water [%] | 40 | 66 | 72 |
|  | Heat shrinkage rate after 10 sec. immersion in 100° C. hot water [%] | 62 | 73 | 74 |
|  | Tensile elasticity in longitudinal direction [MPa] | 1710 | 1950 | 1120 |
|  | Tensile elongation in longitudinal direction [%] | 30 | <10 | 400< |
|  | Spontaneous shrinkage rate after storage for 7 days at 40° C. [%] | 1.2 | 1.2 | 12.3 |
|  | Haze [%] | 8.2 | 9.6 | 8.9 |

The results of Table 3 to Table 6 show that the resin composition of the present invention excels in the balance of physical properties such as rigidity, strength, low-temperature heat shrinkability, spontaneous shrinkage resistance and transparency, particularly excelling in the rigidity and strength necessary when thinning the film. On the other hand, comparative examples 1 to 8 using block copolymers other than the structures claimed by the present invention and comparative examples 9 to 11 which use block copolymers of structures claimed in the present invention but outside the range of blending ratios were not able to achieve good rigidity and strength suitable for thinning, or to achieve a good balance of physical properties such as heat shrinkage rate, spontaneous shrinkage resistance and transparency, thus lacking in quality. Furthermore, the results of Table 8 and Table 9 show that even when the resin composition of the present invention is mixed with a vinyl aromatic hydrocarbon polymer, or a copolymer consisting of a vinyl aromatic hydrocarbon and an acrylic acid ester, or a hydrogenated block copolymer consisting of a vinyl aromatic hydrocarbon and a conjugated diene, it provides a good balance of physical properties enabling it to be thinned for practical use. The heat-shrinkable film using the resin composition of the present invention may be thinned to 40 μm or less, and is suitable for packaging various types of containers.

INDUSTRIAL APPLICABILITY

The resin composition of the present invention is a material that is preferable for thinning of a heat-shrinkable film, and a heat-shrinkable film using this material may be used for various types of packaging films such as bottle labels and cap seals. Additionally, while the resin composition of the present invention is particularly suitable for use as a heat-shrinkable film, the range of applications is not limited due to the fact that it has an excellent balance of physical properties, and it may be used appropriately in applications to various types of molded articles including sheet forming, vacuum forming, injection molding and blow molding.

The invention claimed is:

1. A resin composition comprising block copolymers consisting of a vinyl aromatic hydrocarbon and butadiene, the resin composition (i) having a Vicat softening temperature of 65 to 90° C. measured with a load of 10 N in accordance with ISO306, (ii) having a bending strength of 58 MPa to 80 MPa measured at a test speed of 2 mm/min in accordance with ISO178, (iii) having a proportion of the resin composition occupied by the butadiene being 11 to 22 mass %, and (iv) has one block copolymer (II) having a molecular weight peak in the range of 80000 to 150000 and another block copolymer (I) having a molecular weight peak in the range of 170000 to 300000, wherein
in the block copolymer (I), a proportion of the block copolymer occupied by the butadiene is 5 to 13 mass %, and
in the block copolymer (II), a proportion of the block copolymer occupied by the butadiene is 28 to 70 mass %,
the block copolymer (II) has at least one type of vinyl aromatic hydrocarbon polymer block at a terminus, and
a weight ratio between block copolymers (I) and (II) is (I)/(II)=50/50 to 95/5.

2. The resin composition according to claim 1, further comprising at least one type of polymer chosen from among the following (A) to (C) at a maximum of up to 30 mass %:
(A) a vinyl aromatic hydrocarbon polymer;
(B) a copolymer consisting of a vinyl aromatic hydrocarbon and an acrylic acid ester; and
(C) a hydrogenated block copolymer consisting of a vinyl aromatic hydrocarbon and the butadiene.

3. A heat shrinkable film comprising the resin composition according to claim 1.

4. A container comprising the heat shrinkable film according to claim 3.

* * * * *